United States Patent [19]
Flaherty

[11] Patent Number: 5,400,840
[45] Date of Patent: Mar. 28, 1995

[54] APPARATUS FOR DISPOSAL OF WASTE MOTOR OIL

[76] Inventor: Martin Flaherty, 10 Minchin Dr., Woburn, Mass. 01801

[21] Appl. No.: 178,139

[22] Filed: Jan. 6, 1994

[51] Int. Cl.⁶ .................. F16N 31/00; B65B 39/00
[52] U.S. Cl. .................... 141/384; 141/98; 141/301; 141/59; 137/572; 137/588
[58] Field of Search ............. 141/86, 88, 98, 384, 141/383, 59, 301, 309, 285; 220/571, 571.1, 573, DIG. 6; 184/1.5, 106; 137/571, 572, 588, 589

[56] References Cited

U.S. PATENT DOCUMENTS

| | | | |
|---|---|---|---|
| 192,588 | 7/1877 | Luhrs | 137/588 X |
| 560,922 | 5/1896 | Pearson | 137/588 |
| 987,518 | 3/1911 | Wendling | 141/384 X |
| 1,230,356 | 6/1917 | Wheaton | 141/98 |
| 1,992,319 | 2/1935 | Maggenti | 137/589 |
| 2,081,022 | 5/1937 | Smith | 137/571 X |
| 3,677,369 | 7/1972 | Schramm | 184/1.5 |
| 4,638,841 | 1/1987 | Heath | 141/98 |
| 4,673,081 | 6/1987 | Habig et al. | 206/223 |
| 4,702,290 | 10/1987 | Perez | 141/384 X |
| 4,802,599 | 2/1989 | Hill | 141/86 |
| 4,881,650 | 11/1989 | Bartz | 141/98 |
| 4,911,212 | 3/1990 | Burton | 141/369 |
| 4,974,647 | 12/1990 | Eastom | 141/98 |
| 5,058,636 | 10/1991 | Simmel et al. | 141/309 X |
| 5,082,035 | 1/1992 | Maxwell | 141/98 |
| 5,121,776 | 6/1992 | Kovach | 141/98 |
| 5,188,156 | 2/1993 | Littlepage | 141/98 |
| 5,190,085 | 3/1993 | Dietzen | 141/98 |

FOREIGN PATENT DOCUMENTS

| | | | |
|---|---|---|---|
| 1068569 | 6/1954 | France | 137/571 |
| 0607311 | 12/1934 | Germany | 184/1.5 |

Primary Examiner—J. Casimer Jacyna
Attorney, Agent, or Firm—Norman B. Rainer

[57] ABSTRACT

A valve device for transferring waste oil from a reservoir to an emptied oil vending container having a threaded neck includes a vertical barrel having a rotatable fluid-directing member and an entrance tube horizontally emergent from the barrel and extending to a distal extremity. The lower extremity of the barrel is equipped with an annular closure cap adapted to make fluid-tight joinder with the threaded neck. The distal extremity of the entrance tube is adapted to make fluid-tight joinder with the reservoir.

2 Claims, 2 Drawing Sheets

5,400,840

APPARATUS FOR DISPOSAL OF WASTE MOTOR OIL

BACKGROUND OF THE INVENTION

1. Field of the Invention

This invention concerns the disposal of used motor oil, and more particularly relates to apparatus which facilitates restoration of the oil to its original container for ecologically acceptable disposal.

2. Description of the Prior Art

Periodic replacement of used lubricating oil in an internal combustion engine with fresh oil is necessary for the longevity of the engine. The engines of most automotive vehicles hold between about 4 and 8 quarts of lubricating oil. Commercial facilities such as vehicle maintenance shops generally employ retaining drums for the collection of oil drained from engines. When filled, such drums are routed to a facility which either recycles the oil by a distillative process, or otherwise disposes of the oil in an ecologically approved manner.

However, many vehicle owners prefer to change the oil in their vehicles themselves. To do this, the used oil is drained from the crankcase of the engine into a catch pan, and fresh oil is poured into the oil manifold of the engine from quart or gallon-sized vending containers having screw cap top closures. It is inconvenient for the private vehicle owner to dispose of the used oil in the catch pan in an environmentally safe manner. Instead, most such used oil is merely poured into the ground, poured down a drain leading to the municipal water treatment facility, or mixed with the trash destined for landfill disposal. Such modes of disposal are environmentally harmful, and further represent a waste of the still further useful value of the used oil. The empty vending containers also constitute a disposal problem.

It is accordingly an object of the present invention to provide a re-usable device for expediting the handling and disposal of used motor oil.

It is another object of this invention to provide a device which enables an oil vending container to be utilized for confining said used oil.

It is a further object of the invention to provide a device for transferring used oil to an emptied oil vending container.

It is a still further object of this invention to provide a device of the aforesaid nature which is easy to use, easy to clean and of simple construction amenable to low cost manufacture.

These and other beneficial objects and advantages will be apparent from the following description.

SUMMARY OF THE INVENTION

The above and other beneficial objects and advantages are accomplished in accordance with the present invention by a valve device for transferring waste oil from a catching reservoir to an emptied oil vending container having a threaded neck, said device comprising:

a) a vertical barrel elongated upon a center axis between upper and lower extremities, said lower extremity having a downwardly directed spout of conical contour inwardly convergent upon said axis, b) an entrance tube horizontally emergent from said barrel in communication therewith and terminating in a distal receiving extremity, c) a rotatable fluid-directing member housed within said barrel and having channels for directing fluid flow, d) bushing means disposed within said barrel in fluid-tight sliding abutment with said rotatable member, e) manual turning means exteriorly associated with said barrel and joined to said fluid-directing member for the rotation thereof between a closed position and an open position which permits downward flow of oil through the barrel, f) a threaded annular closure cap rotatably disposed upon said barrel adjacent said lower extremity but above said dispensing spout, and adapted to engage said threaded neck, g) first sealing means for preventing oil leakage between said cap and barrel, and h) second sealing means for preventing oil leakage between said cap and said threaded neck.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
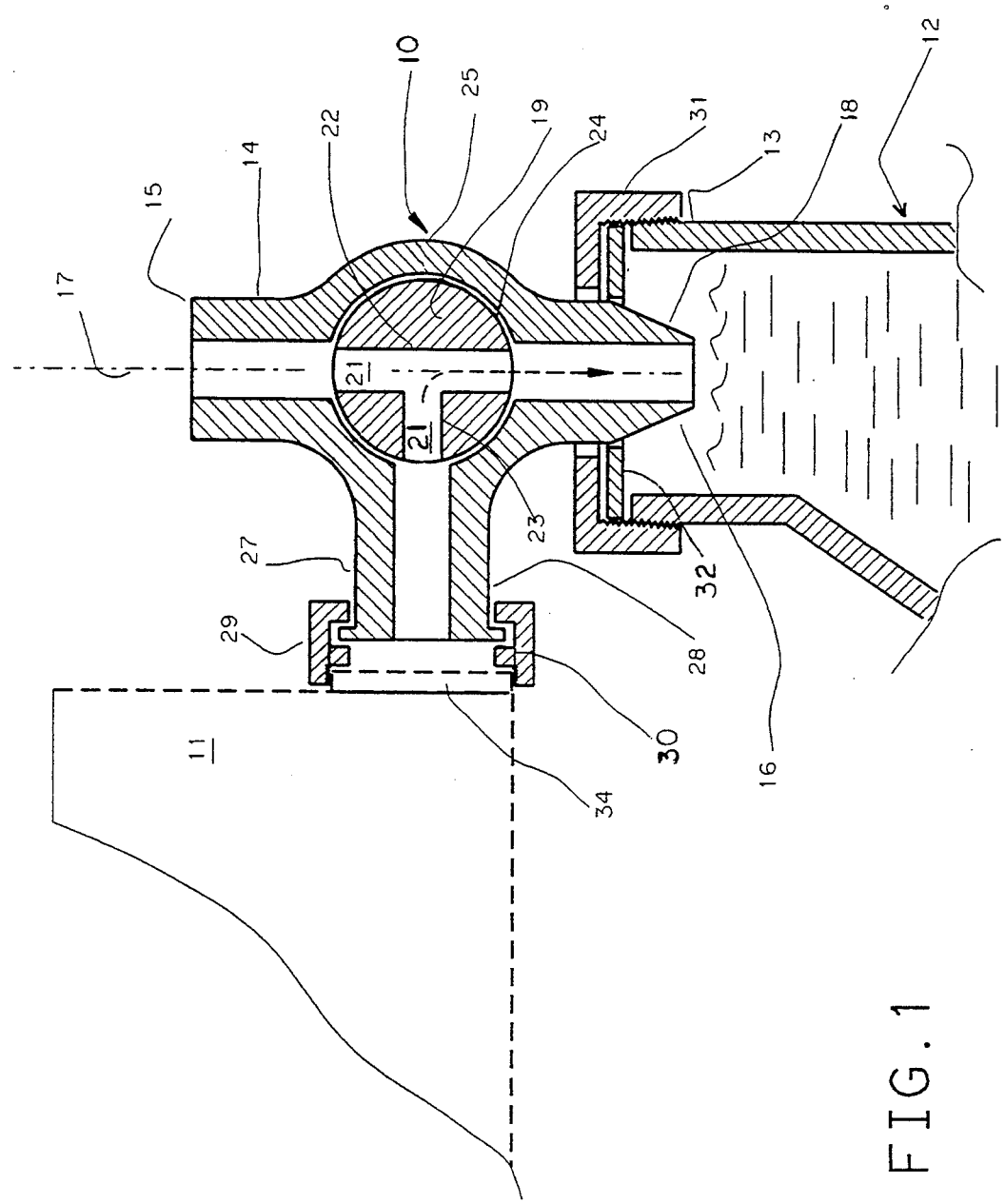
FIG. 1 is a sectional side view of an embodiment of the valve device of this invention shown in operative association with a catch pan and vending container of common design.
Figure 2:
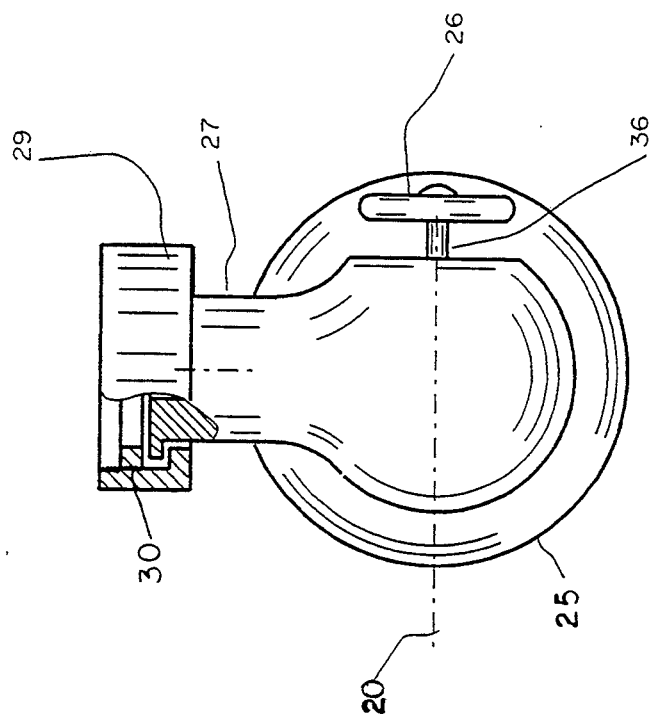
FIG. 2 is a top view of the valve device of FIG. 1.
Figure 3:
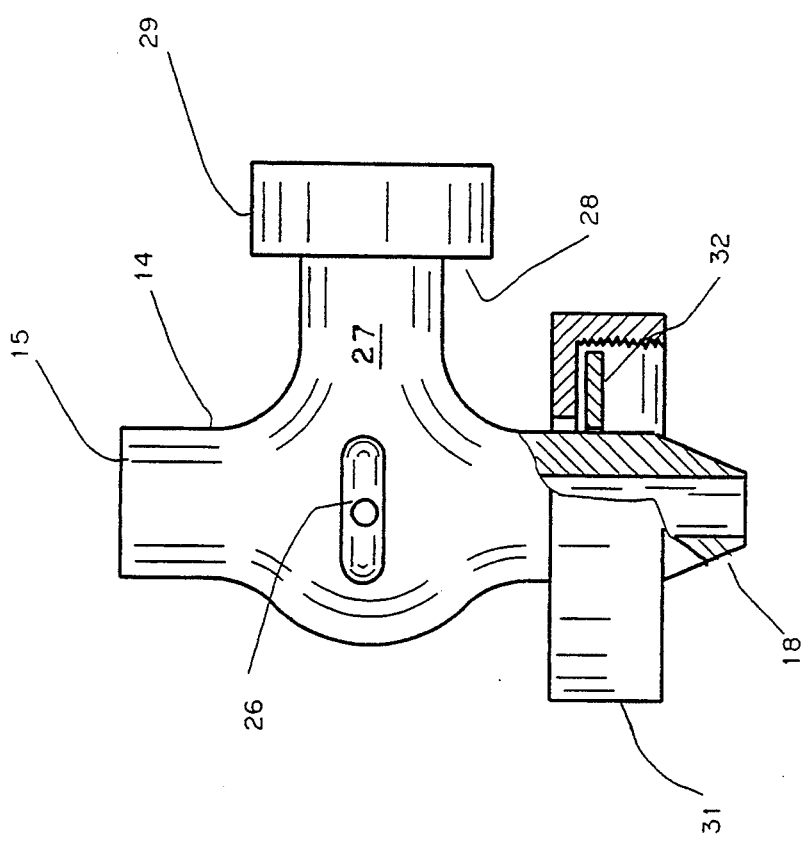
FIG. 3 is an end view of the opposite side of the valve device of FIG. 1.

Referring to FIGS. 1-3, an embodiment of the valve device 10 of the present invention is shown in operative association with an oil catching reservoir 11 and an oil vending container 12 having a threaded neck 13.

The valve device is comprised of vertical barrel 14 extending upon center axis 17 between upper and lower extremities 15 and 16, respectfully. Lower extremity 18 is provided with a downwardly directed dispensing spout 18 of conical contour inwardly convergent upon axis 17.

Entrance tube 27 is horizontally emergent from barrel 14 as a continuous integral extension thereof. The open interior of tube 27 communicates with the open interior of barrel 14. Entrance tube 27 terminates in distal receiving extremity 28 provided with fluid-tight coupling collar 29 which may be of the nature of a garden hose fitting or of other equivalent construction, and is equipped with second sealing means such as gasket 30 to facilitate leak-proof joinder of the valve with reservoir 11.

A fluid directing member 19 rotatable upon axis 20 orthogonal to axis 17 is housed within barrel 14, and is equipped with channels 21 for directing fluid flow. In the exemplified embodiment, channels 21 are in a T-configuration consisting of straight channel 22 and transversely intersecting channel 23. The perimeter 24 of said fluid directing member is of circular contour.

Bushing means in the form of portions 25 of the interior wall of barrel 14 are disposed in close-fitting sliding abutment with perimeter 24 of said fluid directing member.

Manual turning means in the form of handle 26 exterior to barrel 14 joins with shaft 36 that penetrates said barrel in fluid-tight relationship and joins with fluid directing member 19 upon axis 20. By virtue of such construction, fluid directing member 19 can be rotated between an open position as shown in FIG. 1, and a closed position which would be 180 degrees apart from said open position. In said open position, oil is permitted to flow from reservoir 11 downwardly into container 12 as indicated by the arrowed line in FIG. 1. In such open position air within container 12 can be upwardly displaced and vented through straight channel 22.

A threaded annular closure cap 31 is rotatably disposed about barrel 14 adjacent lower extremity 16 but above dispensing spout 18. First sealing means in the form of flat gasket 32 is disposed within cap 31 for preventing leakage between barrel 14 and threaded neck 13.

The valve device is employed by being attached to an oil collection means which forms a reservoir of oil and has an exit port 34 for controlled release of the oil. Once the entrance tube 27 of the valve device is attached to said exit port, spout 18 is entered into the threaded neck of an empty oil vending container. Closure cap 31 is then caused to engage the threaded neck. The fluid directing member 19 is then rotated by means of handle 28 so that the oil flows by gravity effect from the reservoir into the container. Spout 18 prevents over-filling of the container. When the operation is completed, the valve device is removed, and the now oil-filled container is sealed using the threaded cap originally provided with the container. The oil-filled container can now be brought to a proper facility for disposal. The same device of this invention may also be employed in draining and collecting other fluids from vehicles.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A valve device for transferring waste oil from a catching reservoir to an emptied oil vending container having a threaded neck, said device comprising:
   a) a vertical barrel elongated upon a center axis between upper and lower extremities with a channel extending between said upper and lower extremities, said upper extremity being vented to atmosphere, said lower extremity having a downwardly directed spout inwardly convergent upon said axis so as to have a conical contour,
   b) an entrance tube horizontally emergent from said barrel in communication therewith and terminating in a distal receiving extremity provided with first sealing means for achieving leak-proof joinder with said catching reservoir,
   c) a rotatable fluid-directing member housed within said barrel and having two straight channels for directing fluid flow, said channels being in a T-configuration consisting of a straight channel and transversely intersecting channel,
   d) bushing means disposed within said barrel in fluid-tight sliding abutment with said rotatable member,
   e) manual turning means exteriorly associated with said barrel and joined to said fluid-directing member for the rotation thereof between a closed position and an open position wherein said straight channel is coaxial with said barrel, thereby permitting downward flow of oil and upward flow of air through the barrel,
   f) a threaded annular closure cap rotatably disposed upon said barrel adjacent said lower extremity but above said dispensing spout, and adapted to engage said threaded neck, and
   g) second sealing means for preventing oil leakage between said barrel and said threaded neck.

2. The device of claim 1 wherein said first and second sealing means are flat gaskets.

* * * * *